(12) United States Patent
Depta

(10) Patent No.: US 7,502,472 B2
(45) Date of Patent: Mar. 10, 2009

(54) ENCRYPTION SYSTEM AND METHOD FOR ENCRYPTING/DECRYPTING SENSITIVE DATA

(75) Inventor: Robert Depta, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 781 days.

(21) Appl. No.: 10/891,855

(22) Filed: Jul. 15, 2004

(65) Prior Publication Data

US 2005/0058289 A1    Mar. 17, 2005

(30) Foreign Application Priority Data

Jul. 15, 2003   (DE) ................. 103 32 094

(51) Int. Cl.
| | |
|---|---|
| H04K 1/00 | (2006.01) |
| H04L 9/12 | (2006.01) |
| H04L 9/16 | (2006.01) |
| H04L 9/18 | (2006.01) |
| H04L 9/22 | (2006.01) |
| H04N 7/167 | (2006.01) |

(52) U.S. Cl. .............. 380/225; 380/274; 380/259; 380/260

(58) Field of Classification Search ......... 380/225, 380/244, 269, 274, 46, 47, 259, 260
See application file for complete search history.

(56) References Cited

U.S. PATENT DOCUMENTS

| | | | |
|---|---|---|---|
| 5,003,598 A | | 3/1991 | Kumstadt |
| 5,684,962 A | * | 11/1997 | Black et al. ............ 709/238 |
| 5,841,872 A | | 11/1998 | Colvin, Sr. |
| 6,167,136 A | | 12/2000 | Chuo |
| 7,006,633 B1 | * | 2/2006 | Reece ................. 380/260 |

(Continued)

FOREIGN PATENT DOCUMENTS

DE    1 207 426    12/1965

(Continued)

OTHER PUBLICATIONS

Stallings, William. Network Security Essentials, Applications and Standards. 1999 Prentice-Hall, Inc. pp. 48-61, 171-173.*

(Continued)

*Primary Examiner*—Michael J Simitoski
(74) *Attorney, Agent, or Firm*—Cohen Pontani Lieberman & Pavane LLP

(57) ABSTRACT

An encryption system (1) and a method for encrypting and decrypting sensitive data during a data interchange between at least two electronic appliances communicating with one another. The encryption system (1) has a data stream module (2) for providing a synchronous data stream as raw material for key generation, a data module (5) for preparing the data for the encryption/decryption, a key generator (6) to which an agreed information portion of the data stream from the data stream module (2) is supplied, an encryption/decryption unit (7) which is connected to the data module (5) and to the key generator (6) and which encrypts/decrypts the sensitive data using a keyword, and an output unit (7) for forwarding the encrypted/decrypted data, the key generator (6) taking the data stream supplied to it and producing a respective keyword for each message which is to be encrypted/decrypted simultaneously on the appliances communicating with one another.

27 Claims, 1 Drawing Sheet

U.S. PATENT DOCUMENTS

2003/0120940 A1    6/2003    Vataja
2004/0101138 A1*    5/2004    Revital et al. ............... 380/210

FOREIGN PATENT DOCUMENTS

DE      42 43 908 A1    6/1994
WO    WO 00/57595 A    9/2000
WO    WO 02/09344 A1    1/2002

OTHER PUBLICATIONS

Bencsath, B. et al. "Collecting randomness from the net", Nov. 23, 2000.*

Eastlake, D. et al. "Randomness Recommendations for Security"(RFC 1750), Dec. 1994.*

Ellison, Carl. "Cryptographic Random Numbers", 1995, retrieved from <http://www.std.com/~cme/P1363/ranno.html>.*

Miller, Damien. "audio-entropyd", Aug. 1999.*

Menezes, et al. "Handbook of Applied Cryptography, Passage", CRC Press Series on Discrete Mathematics and its Applications, CRC Press, 1997, pp. 16-21, 171-173 and 241-242.

B. Schneider, "Applied Cryptography. Protocols, Algorithms, and Source Code in C, Passage", John Wiley & Sons, 1996, pp. 10-17 and 421-428.

* cited by examiner

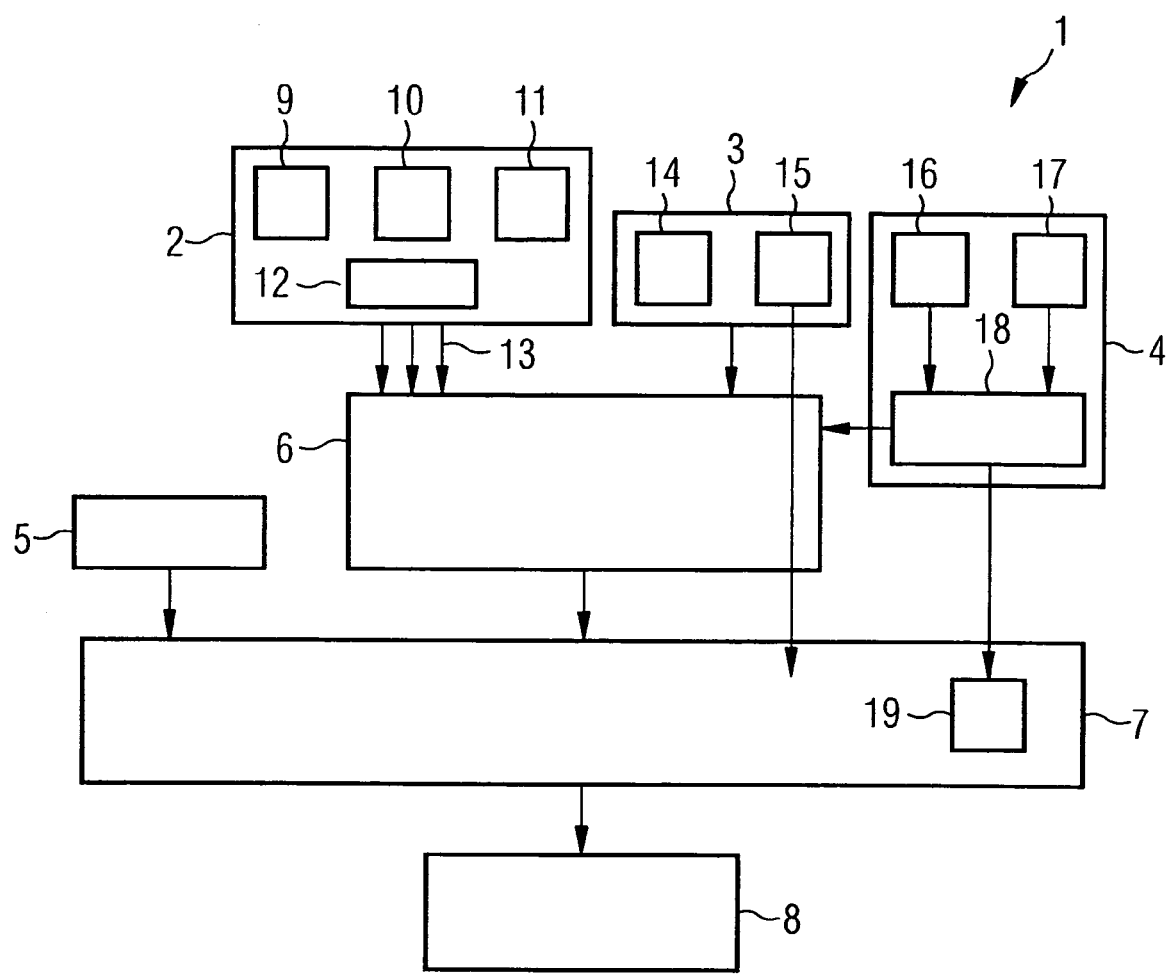

ENCRYPTION SYSTEM AND METHOD FOR ENCRYPTING/DECRYPTING SENSITIVE DATA

CROSS-REFERENCE TO RELATED APPLICATIONS

This patent application claims the priority of German patent application 103 32 094.6 filed 15 Jul. 2003, the disclosure content of which is hereby incorporated by reference.

FIELD OF THE INVENTION

The invention relates to an encryption system for encrypting and decrypting sensitive data during the data interchange between at least two electronic appliances communicating with one another, and to a method for encrypting and decrypting sensitive data.

BACKGROUND OF THE INVENTION

Electronic data interchange, particularly between portable digital information interchange units, such as computer units, laptops, notebooks or tablet units, mobile telephone units and data suppliers, such as service providers on the Internet, for interchanging sensitive data via long transmission links and nonsecure connection nodes results in unauthorized persons being able to access the interchanged data easily. For this reason, protecting the interchanged data is becoming more and more important.

To protect the interchanged data, data associated with security-related applications are encrypted. To this end, encryption systems are provided which make use of electronic keys in order to encrypt the data. However, not only do the data which are to be transmitted need to be protected, but also, to the same extent, the keys generated and the encryption system itself. If an attacker is successful in spying out the encryption and key generation system, then he is able to manipulate or turn off the encryption system and can read transmitted data as plain text and use them for further analysis.

Encryption systems to date operate either using a block algorithm or using a stream algorithm in order to encrypt the data.

A block algorithm involves the use of constant key lengths. A plurality of messages can be encrypted and decrypted using the same key pairs. In order to develop standardized digital circuit arrangements and software procedures or IP cores for encryption systems, the algorithms have been standardized and are thus open. An increase in the security of the encryption can usually be achieved only by increasing the key length and/or by increasing the number of recurring steps. Knowledge of the encryption algorithm in conjunction with the associated keys may subsequently be used to decrypt all data which have been encrypted using this system.

When a stream algorithm is used, either the keys are generated using a particular algorithm, for example a quasi-random algorithm with appropriate initialization vectors which is known to every user, or repeated longer keys are taken from a key database, the keys being kept with each user in a database individually for each message.

Information about block and stream algorithms is available in chapters 6 and 7, at pgs. 191-282 of the "Handbook of Applied Cryptography", A. J. Menezes et al., CRC Press, the content of which is hereby incorporated by reference.

A common feature of the encryption/decryption systems to date is that they encrypt and decrypt a variable message or data rigidly according to a stipulated pattern. In this context, rigid is to be regarded as meaning that both the keys which are to be used and the encryption algorithm are firmly defined. Depending on the keys used and the data transmitted, an analysis of the physical side effects of the circuit arrangement results in a characteristic profile. This profile allows mathematical and/or statistical means to be used to draw conclusions about the keys used and the data encrypted.

SUMMARY OF THE INVENTION

One object of the invention is to provide a secure encryption/decryption system and also a secure method for encrypting/decrypting sensitive data via relatively long transmission links and nonsecure connections.

This and other objects are attained in accordance with one aspect of the present invention directed to an encryption system for encrypting and decrypting sensitive data during the data interchange between at least two electronic appliances communicating with one another, which has a data stream module for providing a synchronous data stream as raw material for key generation, a data module for preparing the sensitive data for the encryption/decryption, a key generator to which an agreed information portion of the data stream from the data stream module is supplied, an encryption/decryption unit which is connected to the data module and to the key generator and which encrypts/decrypts the sensitive data using a keyword, and an output unit for forwarding the encrypted/decrypted data, whereby the key generator takes the data stream supplied to it and generates a respective keyword for each message which is to be encrypted/decrypted simultaneously on the appliances communicating with one another.

Another aspect of the invention is directed to a method for encrypting/decrypting sensitive data in which a data stream provided with a reference timestamp is supplied to a key generator in an encryption system in an electronic appliance, said key generator taking the data stream and producing variable keywords which correspond to a defined algorithm, the sensitive data and keywords are supplied to an encryption/decryption unit in the encryption system, said encryption/decryption unit encrypting/decrypting the data, and the encrypted/decrypted data are forwarded to an output unit in the encryption system, the keywords being simultaneously available on the encryption systems in electronic appliances communicating with one another, and a single keyword being used to encrypt/decrypt the data a single time for a single data interchange of encrypted data.

An embodiment of the invention is based on a symmetrical encryption method, but one in which no keys generated using a random algorithm are used. As raw material for producing the keys, each electronic appliance communicating with another makes use of a continuously available digital data stream, particularly multimedia data streams, which is supplied to the key generator. One particular advantage is that a multiplicity of technologies already available today can be used to retrieve data streams of the aforementioned type using a data module. By way of example, this can be done by retrieving all data available on the Internet from data stream suppliers, such as suppliers for audio or video data. Similarly, the digital broadcast data supplied by a receiver module are highly suitable as base data for producing a key. To this end, the user may be provided with a plurality of data transmission channels simultaneously. The data transmission can be performed using a very wide variety of media. By way of example, they can be received using a cable network or using a terrestrial infrastructure which will be universally available for such services in future.

One great advantage of this transmission technology is that the data transmission malfunctions very infrequently. It is also conceivable for the data stream to be received from satellites. In addition, it is likewise possible to generate a synchronous data stream using a multimedia source, for example a CD player, a DVD player or an MP3 player, which is arranged in a portable medium.

It is likewise possible to use nonmultimedia data stream sources which are available to all users as well. To increase the security of the keys additionally, quasi-random channel changes may be performed.

Another advantageous refinement of the invention provides for the key generator to be supplied with individual system data and with personalized data from authorized users. To this end, firstly system data from the encryption system are recorded in a personalization module in the encryption system, for example in order to attain a clear association between the systems and a group of people. Secondly, the recording of biometric data permits individuals to access the system and permits personalization of individual system units. The data stored as hash values in the personalization module are supplied to the key generator and may advantageously be used in order to attain a further variation in the key generation.

Another refinement of the invention provides for a timer module to synchronize the internal clocks in the electronic appliances and to provide the data stream supplied to the key generator with an identical reference timestamp. Normally, the digital data streams received would first be buffer-stored in an FIFO in the data module, and hash values relating to an information component of the data stream would be formed on all electronic appliances communicating with one another, subsequently called users. These hash values would be interchanged among the users and verified in order to align them in terms of their coherence, and only when the hash values match would the information components of the data stream be used for key generation.

To avoid this procedure, particularly in the case of systems which supply a CRC sum in order to keep data consistent, the internal clocks in the users are synchronized. This has the advantage that the data streams simultaneously arriving with the users are easy to manage. For all users, incoming data for key generation are provided with the same timestamp. Only the information about data losses which have occurred are interchanged among the users, in order to correct the information components of the data streams which are used for key generation.

To generate a reference timestamp, the timer module has a positioning system which receives geographical coordinates and geographical height statements from the respective user. A radio clock module supplies a timestamp having an accuracy associated with atomic clocks. Since the coordinates of the atomic clock operator's transmission antenna are known precisely, a control unit in the timer module calculates the timestamp's delay based on the position of each user. The control unit makes the correction, which means that the internal clocks in the users run in sync with the reference clock with an inaccuracy based on a coordinate measurement system.

When satellite reception is used, the positioning data are also used to ascertain the distance from the satellite transmitter in order to correct the received data stream's timestamp.

The method described above is used to equalize all signal propagation time differences in received data streams. The internal clocks in all of the users run in sync, and the data streams received are provided with a reference timestamp which is identical for all users.

One advantageous extension of the invention is the key generation conversion which the key generator provides. The key generator provides the data streams made available to it with the reference timestamp and mixes the data streams using an agreed algorithm. The selection of the data streams which are to be used is not stipulated rigidly and can be modified at any time. The fact that all users operate using an identical data stream base and an identical time base means that synchronous mixing algorithms can be used for the users, said synchronous mixing algorithms linking only information components of the data streams to one another in order to generate a key. Advantageously, the key generator may include the system-related data and also individual features in the key generation as well.

Another advantageous refinement of the invention provides for the encryption algorithm in the encryption/decryption unit to be based on an arithmetic XOR function as the simplest encryption method. As constants for the encryption algorithm, a very wide variety of systems may be formed by including the system-related data as well. The encryption/decryption unit operates using a symmetrical encryption method, that is to say the same keys are used both for encryption and decryption.

By way of example, a symmetrical encryption algorithm may take the following form:

CIPHER = PLAIN ■ ENDE_KEY
PLAIN = CIPHER ■ ENDE_KEY
where
"PLAIN"      corresponds to the data in an unencrypted form,
"CIPHER"     corresponds to the encrypted data,
"■"          corresponds to the encryption algorithm, and
"ENDE_KEY"   corresponds to the key for encryption and decryption.

For an XOR function as the encryption algorithm, the following is thus obtained:

CIPHER = PLAIN XOR ENDE_KEY
PLAIN = CIPHER XOR ENDE_KEY

In addition, the system-related constants may also be included for key generation.

In summary, embodiments of the proposed method and the encryption system for carrying out the method have various advantages, including at least some of the following:

a. the encryption system generates no keys which can be determined by mathematical algorithms,
b. the keys have an unlimited length,
c. the keys are not repeatable,
d. the keys are available simultaneously with all users,
e. the nonidentical keys exist simultaneously in a plurality of instances,
f. the keys can additionally be encrypted using specific data in the case of personalized appliances,
g. a key which has been generated a single time is basically needed just for one transmission of a data packet,
h. the key length corresponds to the information length which is to be transmitted,
i. the use of the encryption system is suitable both for fixed and mobile users,
j. a plurality of keys can be used simultaneously or can be mixed dynamically,
k. the keys generated can be combined together with any external keys and encryption methods, and 1. the level of security can be increased as desired without any further hardware costs.

BRIEF DESCRIPTION OF THE DRAWINGS

The invention is explained in more detail below using an exemplary embodiment with reference to a drawing which shows a block diagram of an encryption system in accordance with the invention.

DETAILED DESCRIPTION OF THE DRAWING

The only drawing shows the block diagram of an encryption system 1 in accordance with the invention. The encryption system 1 operates using identical hardware for encrypting and decrypting data and, as main components, has a data stream module 2, a personalization module 3, a timer module 4, a data module 5, a key generator 6, an encryption/decryption unit 7 and an output unit 8.

The data stream module 2 supplies identical raw data to all appliances participating in a communication in order to generate a key. The sources used for the raw data may be any digital, particularly multimedia, data streams from:
- all data stream suppliers which exist on the Internet and supply audio, video data and other services via an Internet interface 9,
- digital broadcast data providers whose data streams are received from a cable network, terrestrially or from a satellite using a receiver module 10, and
- a multimedia data source 11.

The raw data received are buffer-stored in a memory unit 12 and are supplied to the key generator 6 selectively via a plurality of channels 13.

To achieve a clear association between the user appliances and particular groups of people, the encryption systems can be personalized, that is to say the systems are loaded with defined secret system-specific data which are stored in a memory unit 14 in the personalization module 3. Individuals can also be assured access to a user appliance by virtue of hash values for biometric data or FFT prints for voices of an authorized user being stored in a further memory unit 15 in the personalization module 3 and being compared, in order to authenticate the user, with data which are input at the present time. Both the secret appliance data and the user-specific data can be supplied to the key generator 6 and included in key generation as well. To this end, the hash values for all users need to have been stored in the respective appliances in question.

The timer module 4 is used to synchronize the internal clocks in the electronic appliances participating in the communication and to provide the data stream supplied to the key generator 6 with a reference timestamp which is identical for all users. To this end, the timer module 4 has a positioning system 16 which receives geographical coordinates and geographical height statements from the respective electronic appliance. The level of synchronism which can be achieved for the reference time is dependent on the accuracy of the participating appliances' coordinate determination. With an accuracy of 10 meters, time synchronism of markedly below 40 nanoseconds is achieved today. A radio clock module 17 in the timer module 4 is used to receive a timestamp with an accuracy associated with atomic clocks. Since the coordinates of the atomic clock timer's transmission antenna are known precisely, a control unit 18 in the timer module 4 calculates this timestamp's corresponding position-based delay, which is different for every user, and makes an internal time correction for each user's system unit. This also covers the satellite transmission time for receiving the corresponding coordinates, the satellite transmission time being calculated back and stored as a timestamp. The effect achieved by this correction is that the internal clocks in all users run in sync with the atomic clock time with an inaccuracy based on the coordinate measurement system. The data streams received simultaneously by all users are provided with the same reference timestamp, so that signal propagation time differences are equalized.

To prepare for encryption, data which are to be encrypted are compressed in the data module 5 and are divided into packets of equal length. Compression allows the required bandwidth to be minimized and makes statistical analysis of the data more difficult. When a user receives encrypted data, these data are prepared for decryption in the data module 5 by decompressing the data, for example, and then forwarding them to the encryption/decryption unit 7.

In the key generator 6, the data made available by the data stream module 2 are provided with a reference timestamp and are mixed using an agreed algorithm. The selection of the data stream which is to be used is not stipulated rigidly and can be changed at any time by the users. The fact that all users operate with an identical data stream base and an identical reference timestamp means that synchronous mixing algorithms can be used for all users, with just portions of the data stream being linked to one another. To generate a key, the system-related secret data stored in the personalization module 3 can be included as well.

Keys which are not needed or are intended for later use are stored in a substitute key unit 19 in the encryption/decryption unit 7. The key generator 6 generates hash values relating to the content of the substitute key unit 19. These hash values are regularly interchanged among the encryption systems 1 in the participating appliances in order to achieve coherence.

The encryption/decryption unit 7 uses a symmetrical encryption method and encrypts or decrypts the data supplied to it from the data module 5. The selection of the encryption methods is not stipulated. As constants, the system-related data stored in the memory unit 14 in the personalization module 3 can be supplied to the encryption/decryption unit 7 and can be used for the encryption algorithm.

In parallel with the encryption, hash values are generated for the data streams and timestamps agreed for key generation and are embedded into the encrypted data which are to be transmitted to the users. After the data have been decrypted, the encryption system 1 receiving the data evaluates these hash values and compares them with its own hash values generated on the basis of the agreed data streams and timestamps. If the hash values do not match, then incorrect data are present. The encryption system 1 receiving the data asks the transmitting user for a repeat data transfer, in which case the data which are to be encrypted afresh are encrypted using a key which is stored in the substitute key unit 19 in the transmitting user's encryption system 1.

Encrypted data are forwarded to a user via the output unit 8, and decrypted data are forwarded to the respective application via the output unit 8, the output unit 8 having appropriate interfaces (not listed here).

The proposed encryption system achieves a very high level of security for the transmission of encrypted data because the use of keys and encryption algorithms which cannot be analyzed.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

The invention claimed is:

1. An encryption system for encrypting and decrypting sensitive data during a data interchange between a plurality of electronic appliances communicating with one another, comprising:
   a data stream module for providing a synchronous data stream as raw material for key generation, said data stream module generating the synchronous data stream by mixing, according to an agreed algorithm, a plurality of continuous multimedia data streams obtained from digital data stream suppliers which exist on the Internet;
   a data module for preparing the sensitive data for the encryption/decryption;
   a key generator to which an agreed information portion of the synchronous data stream from the data stream module is supplied;
   an encryption/decryption unit which is connected to said data module and said key generator said encryption/decryption unit utilizing a keyword to encrypt/decrypt the sensitive data; and
   an output unit for forwarding the encrypted/decrypted sensitive data to a user or application;
   wherein the key generator, based on the supplied synchronous data stream, generates a respective keyword for each message which is to be encrypted/decrypted simultaneously on each of said plural appliances communicating with one another.

2. The encryption system as claimed in claim 1, wherein the data stream module includes a first memory unit which buffer-stores the continuous multimedia data streams that are obtained.

3. The encryption system as claimed in claim 1, further comprising a personalization module which supplies the key generator with system-related data from an electronic appliance and with personalized data from authorized users.

4. The encryption system as claimed in claim 3, wherein the personalization module generates at least one of hash values for biometric data and fast fourier transform (FFT) prints for voices of authenticated users of a particular electronic appliance and stores the hash values for the biometric data and the FFT prints in a first memory unit located within the personalization module.

5. The encryption system as claimed in claim 4, wherein the personalization module includes a second memory unit which stores the system-related data from the particular electronic appliance.

6. The encryption system as claimed in claim 1, further comprising a timer module which synchronizes internal clocks in each of said plural electronic appliances and provides the synchronous data stream supplied to the key generator with an reference timestamp.

7. The encryption system as claimed in claim 6, wherein the timer module includes a positioning system which receives geographical coordinates and geographical height statements from other electronic appliances.

8. The encryption system as claimed in claim 6, wherein the timer module includes a radio clock module which receives the time of day with an accuracy associated with atomic clocks.

9. The encryption system as claimed in claim 6, wherein the timer module includes a control unit which is supplied with positioning data and with atomic clock time and which, for each of said plural electronic appliances, calculates a position-based delay for a timestamp of a radio clock, corrects the timestamp and generates a reference timestamp.

10. The encryption system as claimed in claim 9, wherein the control unit, upon receiving the positioning data from a satellite, ascertains a distance from a transmitter of the satellite and corrects the timestamp for the positioning data received.

11. The encryption system as claimed in claim 1, wherein the data module compresses the sensitive data which are to be encrypted and divides the sensitive data into packets of equal length.

12. The encryption system as claimed in claim 1, wherein the data module decompresses the sensitive data which are to be decrypted.

13. The encryption system as claimed in claim 1, wherein the key generator assigns a reference to the supplied synchronous data stream and uses an agreed algorithm to generate the keyword for each message which is to be encrypted/decrypted.

14. The encryption system as claimed in claim 13, wherein the a length of the generated keyword corresponds to the length of the sensitive data which is to be encrypted.

15. The encryption system as claimed in claim 14, wherein the key generator generates hash values for content of a substitute key memory unit and interchanges the hash values at regular intervals of time with encryption systems the located within each of said plural electronic appliances communicating with one another.

16. The encryption system as claimed in claim 13, wherein generated keywords are not repeatable.

17. The encryption system as claimed in claim 13, wherein the key generator generates unnecessary keys at regular intervals of time and stores the generated keys in a substitute key unit located within the encryption/decryption unit.

18. The encryption system as claimed in claim 1, wherein the keyword is generated by including at least one of system-related data from an electronic appliance and personalized data from authorized users.

19. The encryption system as claimed in claim 1, wherein the encryption/decryption unit encrypts/decrypts the sensitive data based on symmetrical encryption methods.

20. The encryption system as claimed in claim 1, wherein an encryption algorithm used in the encryption/decryption unit is based on an arithmetic XOR function.

21. The encryption system as claimed in claim 1, wherein the encryption/decryption unit encrypts the sensitive data by including system-related data.

22. The encryption system as claimed in claim 1, wherein the encryption/decryption unit generates hash values for those information portions of synchronous data streams and timestamps used for key generation which have been agreed for key generation, incorporates the generated hash values into the encrypted sensitive data when the sensitive data is encrypted, and an encryption system receiving the encrypted sensitive data evaluates the generated hash values when received sensitive data are decrypted and compares said hash values with its own hash values which have been generated.

23. The encryption system as claimed in claim 1, further comprising a control unit which requests a repeat data transfer for an incorrectly received encrypted data packet, with a repeat encryption for a data packet which is to be transmitted being performed using a key which is stored in a substitute key unit.

24. A method for encrypting/decrypting sensitive data using an encryption system, comprising the steps of:
   supplying a synchronous data stream provided with a reference timestamp to a key generator in an encryption system located within an electronic appliance, said key generator generating variable keywords which correspond to a defined algorithm and which are based on the synchronous data stream, wherein the synchronous data stream is generated by mixing, according to an agreed algorithm, a plurality of continuous multimedia data streams obtained from digital data stream suppliers which exist on the Internet;

supplying sensitive data and the variable keywords to an encryption/decryption unit located within the encryption system, said encryption/decryption unit encrypting/decrypting the sensitive data; and forwarding the encrypted/decrypted sensitive data to an output unit located within the encryption system;

wherein the variable keywords generated are, without at least the synchronous data stream, simultaneously available on encryption systems located within each of a plurality of electronic appliances communicating with one another, and a single keyword is used to encrypt/decrypt the sensitive data a single time for a single data interchange of encrypted sensitive data.

25. The method as claimed in claim 24, wherein the method for encrypting/decrypting sensitive data is a symmetrical encryption method.

26. The method as claimed in claim 24, wherein generation of the variable keywords by mathematical algorithms requires at least the synchronous data stream.

27. The method as claimed in claim 24, wherein the generated variable keywords are combinable with at least one of any other and externally supplied keywords.

* * * * *